(12) United States Patent
Tone et al.

(10) Patent No.: US 10,962,379 B2
(45) Date of Patent: Mar. 30, 2021

(54) INFORMATION PROVIDING DEVICE, INFORMATION PROVIDING SYSTEM, INFORMATION PROVIDING METHOD, AND NON-TRANSITORY COMPUTER-READABLE MEDIUM

(71) Applicant: TOYOTA JIDOSHA KABUSHIKI KAISHA, Toyota (JP)

(72) Inventors: Taisuke Tone, Toyota (JP); Xin Jin, Nagoya (JP); Atsushi Kubo, Toyota (JP); Miharu Hanai, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 16/406,332

(22) Filed: May 8, 2019

(65) Prior Publication Data

US 2019/0390967 A1    Dec. 26, 2019

(30) Foreign Application Priority Data

Jun. 21, 2018   (JP) ................................. 2018-117952

(51) Int. Cl.
*G01C 21/34* (2006.01)
*G01C 21/36* (2006.01)

(52) U.S. Cl.
CPC ....... *G01C 21/343* (2013.01); *G01C 21/3679* (2013.01)

(58) Field of Classification Search
CPC .............. G01C 21/343; G01C 21/3617; G01C 21/3679
See application file for complete search history.

(56) References Cited

U.S. PATENT DOCUMENTS

| 9,820,108 B1 * | 11/2017 | Lnciong; Sarah ............... H04M 1/72566 |
| 10,496,705 B1 * | 12/2019 | Irani .......................... G06F 9/44 |
| 2002/0077122 A1 * | 6/2002 | Yule ....................... G08G 1/005 455/456.3 |
| 2003/0004776 A1 * | 1/2003 | Perrella ............ G06Q 10/06311 705/7.19 |

(Continued)

FOREIGN PATENT DOCUMENTS

| JP | 2003-302240 A | 10/2003 |
| JP | 2008-232757 A | 10/2008 |

(Continued)

*Primary Examiner* — Babar Sarwar
(74) *Attorney, Agent, or Firm* — Hunton Andrews Kurth LLP

(57) ABSTRACT

An information providing device includes a memory configured to store estimated destinations on a map in association with scheduled activity venue names, and a processor. The processor is configured to: acquire a user's scheduled activity venue name from user's activity schedule information; read a user's estimated destination corresponding to the user's scheduled activity venue name from the memory; provide an in-vehicle device with information for presenting a route to the user's estimated destination; acquire information regarding a stay place from the in-vehicle device; and store the stay place, in the memory, as a new estimated destination in association with the user's scheduled activity venue name, when the user's estimated destination differs from the stay place.

9 Claims, 6 Drawing Sheets

(56) References Cited

U.S. PATENT DOCUMENTS

| | | | |
|---|---|---|---|
| 2004/0054468 A1* | 3/2004 | Yamada | G06Q 10/109 701/438 |
| 2004/0128066 A1* | 7/2004 | Kudo | G08G 1/096866 701/468 |
| 2006/0173841 A1* | 8/2006 | Bill | G01C 21/3492 |
| 2009/0030885 A1* | 1/2009 | DePasquale | G07C 5/008 |
| 2010/0174998 A1* | 7/2010 | Lazarus | G06Q 10/109 715/751 |
| 2010/0306309 A1* | 12/2010 | Santori | G06F 9/54 709/203 |
| 2011/0076994 A1* | 3/2011 | Kim | G06Q 10/109 455/414.2 |
| 2012/0088525 A1* | 4/2012 | Kurokawa | H04W 4/029 455/456.5 |
| 2012/0197523 A1* | 8/2012 | Kirsch | H04M 1/6083 701/426 |
| 2012/0254763 A1* | 10/2012 | Protopapas | G06Q 10/1097 715/738 |
| 2013/0080537 A1* | 3/2013 | Protopapas | G06Q 10/109 709/205 |
| 2013/0151149 A1* | 6/2013 | Kristinsson | G01C 21/362 701/533 |
| 2015/0160029 A1* | 6/2015 | Kobayashi | G08G 1/0969 701/32.3 |
| 2015/0345958 A1* | 12/2015 | Graham | G06Q 10/1095 701/22 |
| 2018/0131204 A1* | 5/2018 | Weicker | B60L 58/15 |
| 2018/0188695 A1* | 7/2018 | Kumar | G04G 13/02 |
| 2018/0312072 A1* | 11/2018 | Yang | B60L 53/67 |
| 2018/0374040 A1* | 12/2018 | Hunt | G06Q 10/0835 |

FOREIGN PATENT DOCUMENTS

| | | |
|---|---|---|
| JP | 2008-234378 A | 10/2008 |
| JP | 2011-123747 A | 6/2011 |

\* cited by examiner

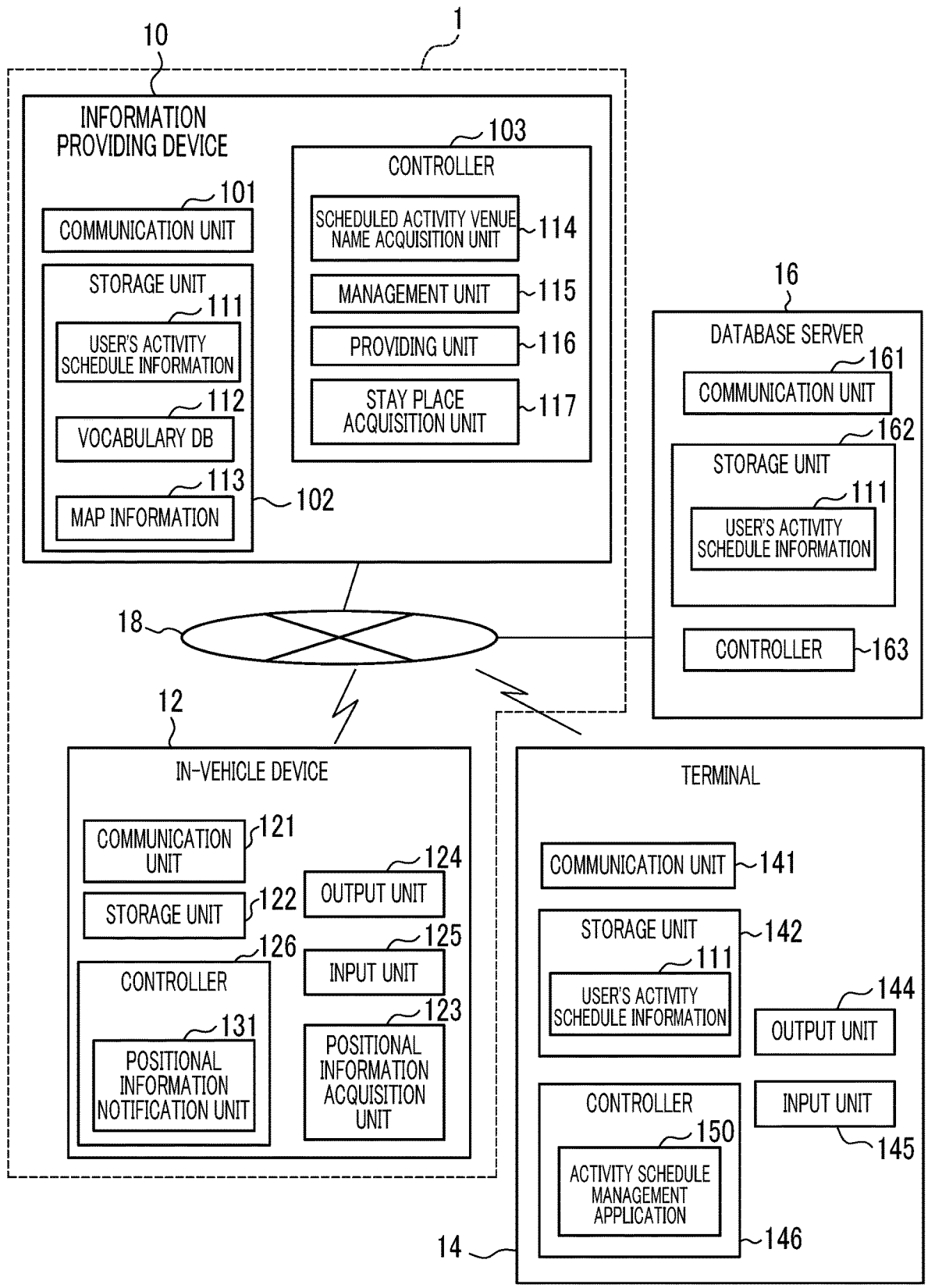

| DATE AND TIME | SCHEDULED ACTIVITY VENUE NAME | USER'S ACTIVITY |
|---|---|---|
| 5/12/2018 09:00 | COMPANY | CONFERENCE |
| 6/2/2018 12:00 | HOTEL A | LUNCH |
| 7/20/2018 15:00 | CUSTOMER | MEETING |
| 8/20/2018 16:00 | COMPANY B | CONTRACT |

| SCHEDULED ACTIVITY VENUE NAME | ESTIMATED DESTINATION | |
|---|---|---|
| COMPANY | NAGOYA AAA BBB SQUARE | 35.658593; 139.745441 |
| HOTEL A | ABC GRAND HOTEL | 34.69103; 135.532913 |
| CUSTOMER | KOUOTSU SHOJI CO., LTD. | 35.17213; 136.884556 |
| COMPANY B | BCD CO., LTD. | 43.064359; 141.347449 |

INFORMATION PROVIDING DEVICE, INFORMATION PROVIDING SYSTEM, INFORMATION PROVIDING METHOD, AND NON-TRANSITORY COMPUTER-READABLE MEDIUM

INCORPORATION BY REFERENCE

The disclosure of Japanese Patent Application No. 2018-117952 filed on Jun. 21, 2018 including the specification, drawings and abstract is incorporated herein by reference in its entirety.

BACKGROUND

1. Technical Field

The present disclosure relates to an information providing device, an information providing system, an information providing method, and a non-transitory computer-readable medium storing a program, for estimating a destination based on an activity schedule.

2. Description of Related Art

A technique of automatically setting a destination and providing route guidance to the destination has been applied to vehicle navigation systems, in order to improve the user convenience. Such a technique is described in, for example, Japanese Unexamined Patent Application Publication No. 2008-232757 (JP 2008-232757 A). In this technique, in response to a user's entry of a scheduled activity venue (i.e., a place where an activity is scheduled to be carried out) into an activity schedule entry medium, a navigation system reads the scheduled activity venue and then provides route guidance to the scheduled activity venue.

SUMMARY

There is a technique of acquiring information regarding a scheduled activity venue from a user's activity schedule. In this technique, when a user inputs an activity schedule into a mobile terminal, a medium, or the like, the user sometimes inputs the name of a scheduled activity venue (hereinafter, referred to as "scheduled activity venue name") in an abbreviated name or in a usually-used name. In such a case, a location having a name corresponding to the scheduled activity venue name cannot be specified on a map. This may cause difficulty in setting a destination.

The present disclosure provides an information providing device, an information providing system, an information providing method, and a non-transitory computer-readable medium storing a program, for appropriately estimating a destination corresponding to a user's scheduled activity venue name, thereby facilitating destination setting and route guidance.

A first aspect of the present disclosure relates to an information providing device. The information providing device includes: a memory configured to store estimated destinations on a map in association with respective scheduled activity venue names; and a processor configured as follows. The processor is configured to: acquire a user's scheduled activity venue name from user's activity schedule information; read a user's estimated destination corresponding to the user's scheduled activity venue name from the memory; provide an in-vehicle device with information for presenting a route to the user's estimated destination; acquire information regarding a stay place from the in-vehicle device; and store the stay place, in the memory, as a new estimated destination in association with the user's scheduled activity venue name, when the user's estimated destination differs from the stay place.

In the information providing device according to the first aspect, the processor may be configured to store the stay place, in the memory, as the new estimated destination in association with the user's scheduled activity venue name, when the user's estimated destination differs from the stay place and a location corresponding to the user's scheduled activity venue name is present in a vicinity of the stay place.

In the information providing device according to the first aspect, the processor may be configured to store the stay place, in the memory, as the new estimated destination in association with the user's scheduled activity venue name, when the number of times that the user's estimated destination differs from the stay place reaches a predetermined number of times.

In the information providing device according to the first aspect, the processor may be configured to derive the stay place from information regarding a position where the in-vehicle device is present when the in-vehicle device is deactivated and information regarding a position where the in-vehicle device is present when the in-vehicle device is activated.

In the information providing device according to the first aspect, he processor may be configured to derive the stay place, when an elapsed time from deactivation of the in-vehicle device to activation of the in-vehicle device is equal to or longer than a predetermined time.

In the information providing device according to the first aspect, the information regarding the stay place may include a position of a vehicle in which the in-vehicle device is mounted. The position of the vehicle is derived based on a motion state of the vehicle.

A second aspect of the present disclosure relates to a non-transitory computer-readable medium storing a program configured to enable a processor to execute an information providing method using an information providing device including the processor and a memory. The memory is configured to store estimated destinations on a map in association with respective scheduled activity venue names. The program is configured to enable the processor to execute a control process. The control process includes: acquiring a user's scheduled activity venue name from user's activity schedule information; reading a user's estimated destination corresponding to the user's scheduled activity venue name from the memory; providing an in-vehicle device with information for presenting a route to the user's estimated destination; acquiring information regarding a stay place from the in-vehicle device; and storing the stay place, in the memory, as a new estimated destination in association with the user's scheduled activity venue name, when the user's estimated destination differs from the stay place.

A third aspect of the present disclosure relates to an information providing system including an in-vehicle device and an information providing device. The in-vehicle device includes an output device configured to output a route to a destination, and a transmitter configured to transmit information regarding a stay place to the information providing device. The information providing device includes a memory and a processor. The memory is configured to store estimated destinations on a map in association with respective scheduled activity venue names. The processor is configured to: acquire a user's scheduled activity venue name from user's activity schedule information; read a user's estimated destination corresponding to the user's scheduled activity venue name from the memory; provide the in-vehicle device with information for presenting a route to the user's estimated destination; and store the stay place acquired from the in-vehicle device, in the memory, as a new estimated destination in association with the user's scheduled activity venue name, when the user's estimated destination differs from the stay place acquired from the in-vehicle device.

A fourth aspect of the present disclosure relates to an information providing method using an information providing device and an in-vehicle device. The information providing device includes a processor and a memory. The memory is configured to store estimated destinations on a map in association with respective scheduled activity venue names. The information providing method includes: acquiring, by the processor, a user's scheduled activity venue name from user's activity schedule information; reading, by the processor, a user's estimated destination corresponding to the user's scheduled activity venue name from the memory; providing, by the processor, the in-vehicle device with information for presenting a route to the user's estimated destination; outputting, by the in-vehicle device, a route to the user's estimated destination; transmitting, by the in-vehicle device, information regarding a stay place to the information providing device; and storing, by the processor, the stay place acquired from the in-vehicle device, in the memory, as a new estimated destination in association with the user's scheduled activity venue name, when the user's estimated destination differs from the stay place acquired from the in-vehicle device.

According to the foregoing aspects of the present disclosure, it is possible to appropriately estimate a destination corresponding to a user's scheduled activity venue name and to present the destination to a user.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a diagram illustrating the configuration of an information providing system;

FIG. 2A is a table illustrating an example of user's activity schedule information;

FIG. 2B is a table illustrating an example of a vocabulary database;

DETAILED DESCRIPTION OF EMBODIMENTS

Figure 3:
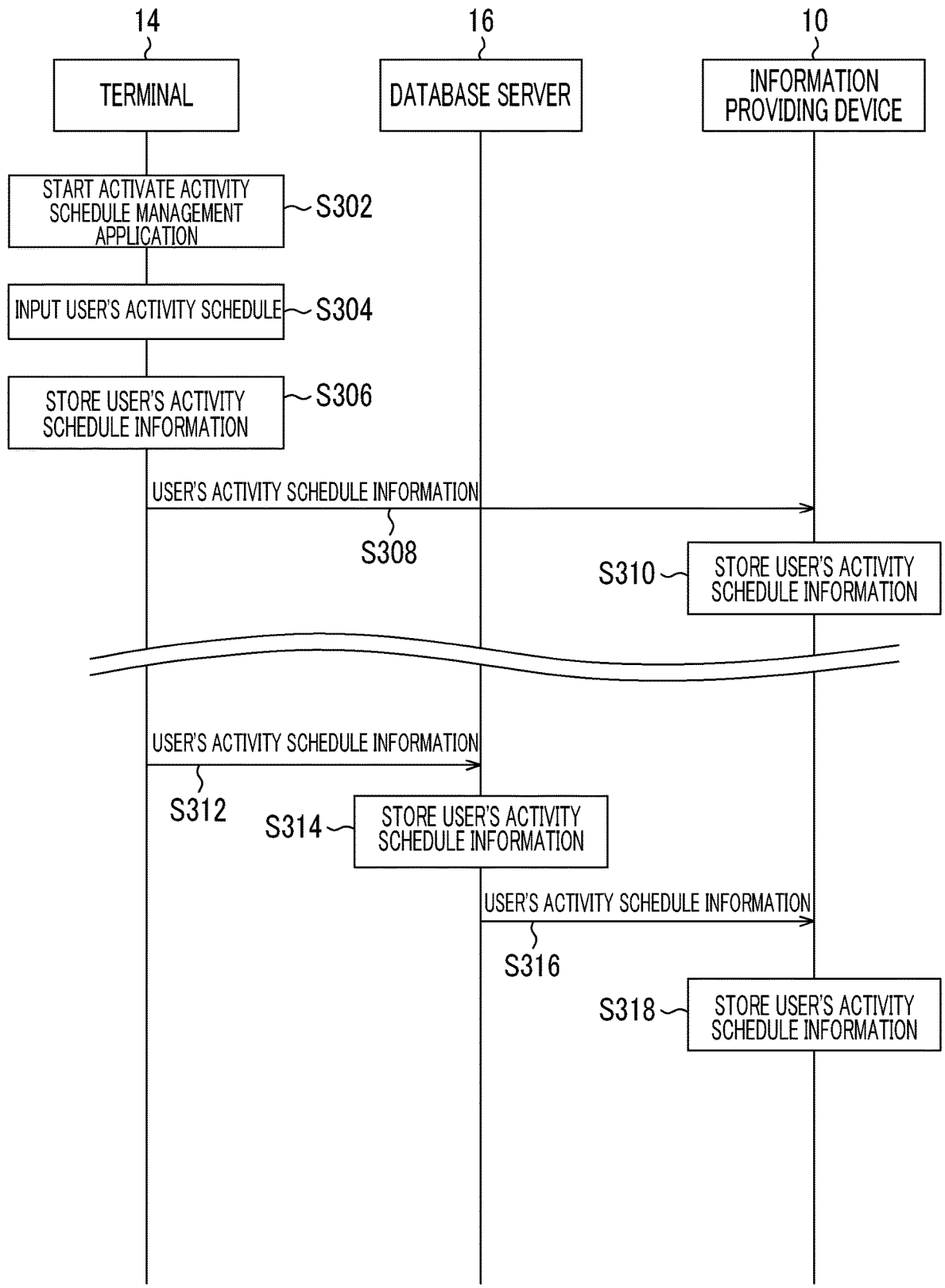
FIG. 3 is a sequence diagram illustrating a procedure by which an information providing device acquires user's activity schedule information.

Hereinafter, an embodiment of the present disclosure will be described with reference to the accompanying drawings.

FIG. 1 illustrates the configuration of an information providing system 1 according to the present embodiment. The information providing system 1 includes an information providing device 10 and an in-vehicle device 12. The information providing system 1 may further include a terminal 14 and a database server 16. The information providing device 10, the in-vehicle device 12, the terminal 14, and the database server 16 are connected to a network 18, and transmit and receive data by wire or wirelessly through the network 18. The information providing device 10 is, for example, a server computer. The terminal 14 is, for example, a portable electronic device carried by a user, such as a smartphone or a tablet terminal. The in-vehicle device 12 is, for example, a car navigation device. The in-vehicle device 12 is mounted in a vehicle that is driven by the user of the terminal 14. The database server 16 is, for example, a server computer that is provided by a service provider. The network 18 is, for example, a mobile communication network and the Internet.

The user inputs an activity schedule into, for example, the terminal 14, and the information providing device 10 acquires user's activity schedule information, which is information regarding the activity schedule of the user, from the terminal 14. Alternatively, the user's activity schedule information is transmitted from the terminal 14 to the database server 16 and stored in the database server 16, and then the information providing device 10 acquires the user's activity schedule information from the database server 16. Then, the information providing device 10 acquires, from the user's activity schedule information, a user's scheduled activity venue name, which is a name of a place where the user is scheduled to carry out an activity. Then, the information providing device 10 estimates a destination on a map, which corresponds to the user's scheduled activity venue name, and stores the estimated destination in association with the user's scheduled activity venue name. Then, the information providing device 10 transmits, to the in-vehicle device 12, information regarding the estimated destination associated with the user's scheduled activity venue name. Then, the in-vehicle device 12 presents, to the user, a route to the estimated destination, and provides route guidance. The information providing device 10 may search for a route to the estimated destination and provide the in-vehicle device 12 with route information, and the in-vehicle device 12 may provide route guidance. Alternatively, the information providing device 10 may notify the in-vehicle device 12 of the estimated destination, and the in-vehicle device 12 may perform a route search and provide route guidance. In such a configuration, the information providing device 10 corrects the estimated destination to be associated with the user's scheduled activity venue name based on information regarding a stay place, which is acquired from the in-vehicle device 12, according to a procedure described later. In this way, it is possible to improve the accuracy with which a destination is estimated.

The information providing device 10 includes a communication unit 101, a storage unit 102, and a controller 103. Note that the storage unit 102 is an example of "memory" according to the present disclosure, and the controller 103 is an example of "processor" according to the present disclosure.

The communication unit 101 includes one or more communication modules to be connected to the network 18. The one or more communication modules may include a module that is compliant with a prescribed radio communication standard or a prescribed wireless communication standard.

In the present embodiment, the information providing device 10 is connected to the network 18 via the communication unit 101.

The storage unit 102 includes one or more memories. Each memory is, for example, a semiconductor memory, a magnetic memory, or an optical memory. Each memory may function as, for example, a main storage device, an auxiliary storage device, or a cache memory. The storage unit 102 stores control and processing programs relating to control and processing operations of the information providing device 10. The storage unit 102 temporarily stores various kinds of information to be used in the control and processing operations of the information providing device 10. The storage unit 102 stores user's activity schedule information 111, a vocabulary database 112, and map information 113.

An example of the user's activity schedule information 111 and an example of the vocabulary database 112 will be described with reference to FIG. 2A and FIG. 2B, respectively. As illustrated in FIG. 2A, the user's activity schedule information 111 includes an activity schedule of a user. The activity schedule includes combinations of data items, such as dates and times, user's scheduled activity venue names, and user's activities. In some cases, the user inputs a user's scheduled activity venue name, for example, in an abbreviated name, such as "Hotel A" or "Company B" or in a usually-used name, such as "company" or "customer", instead of inputting the user's scheduled activity venue name in a name of a location in the map information 113. Thus, as illustrated in FIG. 2B, in the vocabulary database 112, locations on a map, which are specified based on the map information 113, are stored as estimated destinations in association with the user's scheduled activity venue names including an abbreviated name or a usually-used name. Each estimated destination includes, for example, a facility name or a place name, and a position, so that the location on the map can be specified.

The vocabulary database 112 is set, for example, in the following manner. A provider who provides information with the use of the information providing device 10 registers, in advance, combinations of commonly-used names of scheduled activity venues and estimated destinations artificially or through machine learning, whereby the vocabulary database 112 is set. Alternatively, for example, when the information providing device 10 acquires the user's activity schedule information 111 from the terminal 14 or the database server 16, the information providing device 10 may check each user's scheduled activity venue name against facility names or place names in the map information 113, extract a facility name or a place name that partially or wholly coincides with the user's scheduled activity venue name, and register the extracted facility name or place name, as an estimated destination, in association with the user's scheduled activity venue name. Further alternatively, for example, the user may manipulate the terminal 14 to perform an operation for associating a facility name or a place name on a map, as an estimated destination, with a given user's scheduled activity venue name, thereby registering the user's scheduled activity venue name and the estimated destination in the vocabulary database 112.

The information providing device 10 includes the user's activity schedule information 111 and the vocabulary database 112, so that the information providing device 10 stores estimated destinations on a map in association with scheduled activity venue names. That is, the information providing device 10 estimates, using the vocabulary database 112, an estimated destination corresponding to a user's scheduled activity venue name included in an activity schedule of a user, and extracts positional information (e.g., latitude and longitude information) about the estimated destination from the map information 113. Alternatively, in the vocabulary database 112, each estimated destination may be stored in association with its positional information. In this way, the information providing device 10 can provide the in-vehicle device 12 with information for presenting a route to an estimated destination associated with a scheduled activity venue name.

Referring back to FIG. 1, the controller 103 includes one or more processors. Each processor may be, but is not limited to, a general-purpose processor or a processor dedicated to specific processing. The controller 103 controls operations of the information providing device 10 according to control and processing programs. When the controller 103 executes the control and processing operations, a scheduled activity venue name acquisition unit 114, a management unit 115, a providing unit 116, and a stay place acquisition unit 117 are implemented. The operation of each unit will be described later.

The in-vehicle device 12 includes a communication unit 121, a storage unit 122, a positional information acquisition unit 123, an output unit 124, an input unit 125, and a controller 126.

The communication unit 121 includes one or more communication modules to be connected to the network 18. The one or more communication modules may include a module that is compliant with a mobile communication standard, such as 4th Generation (4G) standard or 5th Generation (5G) standard. The communication unit 121 may include a communication device, such as a data communication module (DCM). The in-vehicle device 12 is connected to the network 18 via the communication unit 121.

The storage unit 122 includes one or more memories. Each memory is, for example, a semiconductor memory, a magnetic memory, or an optical memory. Each memory may function as, for example, a main storage device, an auxiliary storage device, or a cache memory. The storage unit 122 stores, for example, control and processing programs relating to control and processing operations of the in-vehicle device 12, and map information. The storage unit 122 temporarily stores various kinds of information, such as positions, braking, and speeds, to be used in the control and processing operations of the in-vehicle device 12.

The positional information acquisition unit 123 includes a receiver that is compatible with a given satellite positioning system. The positional information acquisition unit 123 may include, for example, a global positioning system (GPS) receiver. The positional information acquisition unit 123 acquires a motion state of the vehicle from various sensors that detect, for example, a vehicle speed, a steering angle, and a yaw rate. The positional information acquisition unit 123 sends, for example, positioning information and information regarding the motion state of the vehicle, to the controller 126.

The output unit 124 includes an output interface that outputs, to the user, information generated by the controller 126 or information read from the storage unit 122. The output interface is, for example, a panel display or a head-up display that outputs information in the form of an image or video, or a speaker that outputs information in the form of voice. However, the output interface is not limited to these devices, and any output interface may be employed.

The input unit 125 includes an input interface that detects a user input and sends input information to the controller 126. The input interface is, for example, a mechanical keyboard, a capacitance keyboard, a touch screen provided so as to be integral with the panel display of the output unit 124, or a microphone that receives a voice input. However, the input interface is not limited to these devices, and any input interface may be employed.

The controller 126 includes one or more processors. Each processor may be, but is not limited to, a general-purpose processor or a processor dedicated to specific processing. The controller 126 controls driving assistance operations of the in-vehicle device 12, such as a route search and route guidance, according to control and processing programs. The controller 126 derives a current position of the vehicle based on the positioning information and the information regarding the motion state of the vehicle that are sent from the positional information acquisition unit 123. Then, the controller 126 transmits positional information indicating the current position of the vehicle to the information providing device 10 via the communication unit 121. When the controller 126 executes such an operation, a positional information notification unit 131 is implemented. The positional information notification unit 131 derives and transmits the positional information when deactivation of the in-vehicle device 12 is detected and immediately after activation of the in-vehicle device 12, that is, when an accessory power source is turned off (at the time of ACC-OFF) and when the accessory power source is turned on (at the time of ACC-ON).

The terminal 14 includes a communication unit 141, a storage unit 142, an output unit 144, an input unit 145, and a controller 146.

The communication unit 141 includes one or more communication modules to be connected to the network 18. The one or more communication modules may include a module that is compliant with a mobile communication standard, such as 4th Generation (4G) standard or 5th Generation (5G) standard. The terminal 14 is connected to the network 18 via the communication unit 141.

The storage unit 142 includes one or more memories. Each memory may be, but is not limited to, a semiconductor memory. Each memory included in the storage unit 142 may function as, for example, a main storage device, an auxiliary storage device, or a cache memory. The storage unit 142 stores control and processing programs relating to control and processing operations of the terminal 14. The storage unit 142 temporarily stores various kinds of information used in the control and processing operations of the terminal 14. The storage unit 142 further stores the user's activity schedule information 111 corresponding to the activity schedule input by the user.

The output unit 144 includes an output interface that outputs, to the user, information generated by the controller 146 or information read from the storage unit 142. The output interface is, for example, a panel display that outputs information in the form of an image or video, or a speaker that outputs information in the form of voice. However, the output interface is not limited to these devices, and any output interface may be employed.

The input unit 145 includes an input interface that detects a user input and sends input information to the controller 146. The input interface is, for example, a mechanical keyboard, a capacitance keyboard, a touch screen provided so as to be integral with the panel display of the output unit 144, or a microphone that receives a voice input. However, the input interface is not limited to these devices, and any input interface may be employed.

The controller 146 includes one or more processors. Each processor may be, but is not limited to, a general-purpose processor or a processor dedicated to specific processing. The controller 146 controls the operations of the terminal 14 and executes applications installed on the terminal 14 according to control and processing programs. For example, when the controller 146 executes an activity schedule management application 150, the controller 146 receives an input of a user's activity schedule, stores the user's activity schedule information 111 in the storage unit 142, and outputs the user's activity schedule information 111 to the user in response to an input of the user's request. The controller 146 transmits the user's activity schedule information 111 from the communication unit 141 to the database server 16 through the network 18, receives, at the communication unit 141, the user's activity schedule information 111 from the database server 16 in response to an input of the user's request, and outputs the user's activity schedule information 111 to the user.

The database server 16 includes a communication unit 161, a storage unit 162, and a controller 163.

The communication unit 161 includes one or more communication modules to be connected to the network 18. The one or more communication modules may include a module that is compliant with a prescribed radio communication standard or a prescribed wireless communication standard. The database server 16 is connected to the network 18 via the communication unit 161.

The storage unit 162 includes one or more memories. Each memory is, for example, a semiconductor memory, a magnetic memory, or an optical memory. Each memory may function as, for example, a main storage device, an auxiliary storage device, or a cache memory. The storage unit 162 stores control and processing programs relating to control and processing operations of the database server 16. The storage unit 162 temporarily stores various kinds of information used in the control and processing operations of the database server 16. The storage unit 162 stores the user's activity schedule information 111. The user's activity schedule information 111 is received from, for example, the terminal 14, and stored in the storage unit 162.

The controller 163 includes one or more processors. Each processor may be, but is not limited to, a general-purpose processor or a processor dedicated to specific processing. The controller 163 controls the operations of the database server 16 according to control and processing programs. The controller 163 receives the user's activity schedule information 111 transmitted from the terminal 14 and stores the user's activity schedule information 111 in the storage unit 162. For example, the controller 163 reads the user's activity schedule information 111 from the storage unit 162 and transmits the user's activity schedule information 111 to the terminal 14 or transmits the user's activity schedule information 111 to the information providing device 10.

FIG. 3 to FIG. 6 are diagrams each illustrating a procedure of an operation of the information providing system 1.

FIG. 3 is a sequence diagram illustrating a procedure by which the information providing device 10 acquires the user's activity schedule information 111.

After a user activates the activity schedule management application 150 of the terminal 14 (Step S302) and inputs a user's activity schedule (Step S304), the terminal 14 stores the user's activity schedule information 111 in the storage unit 142 (Step S306) and transmits the user's activity schedule information 111 to the information providing device 10 (Step S308). Upon reception of the user's activity schedule information 111, the information providing device 10 stores the user's activity schedule information 111 in the storage unit 102 (Step S310).

Alternatively, the terminal 14 transmits the user's activity schedule information 111 to the database server 16 (Step S312). Upon reception of the user's activity schedule information 111, the database server 16 stores the user's activity schedule information 111 in the storage unit 162 (Step S314), and transmits the user's activity schedule information 111 to the information providing device 10 (Step S316). Upon reception of the user's activity schedule information 111, the information providing device 10 stores the user's activity schedule information 111 in the storage unit 102 (Step S318).

Figure 4:
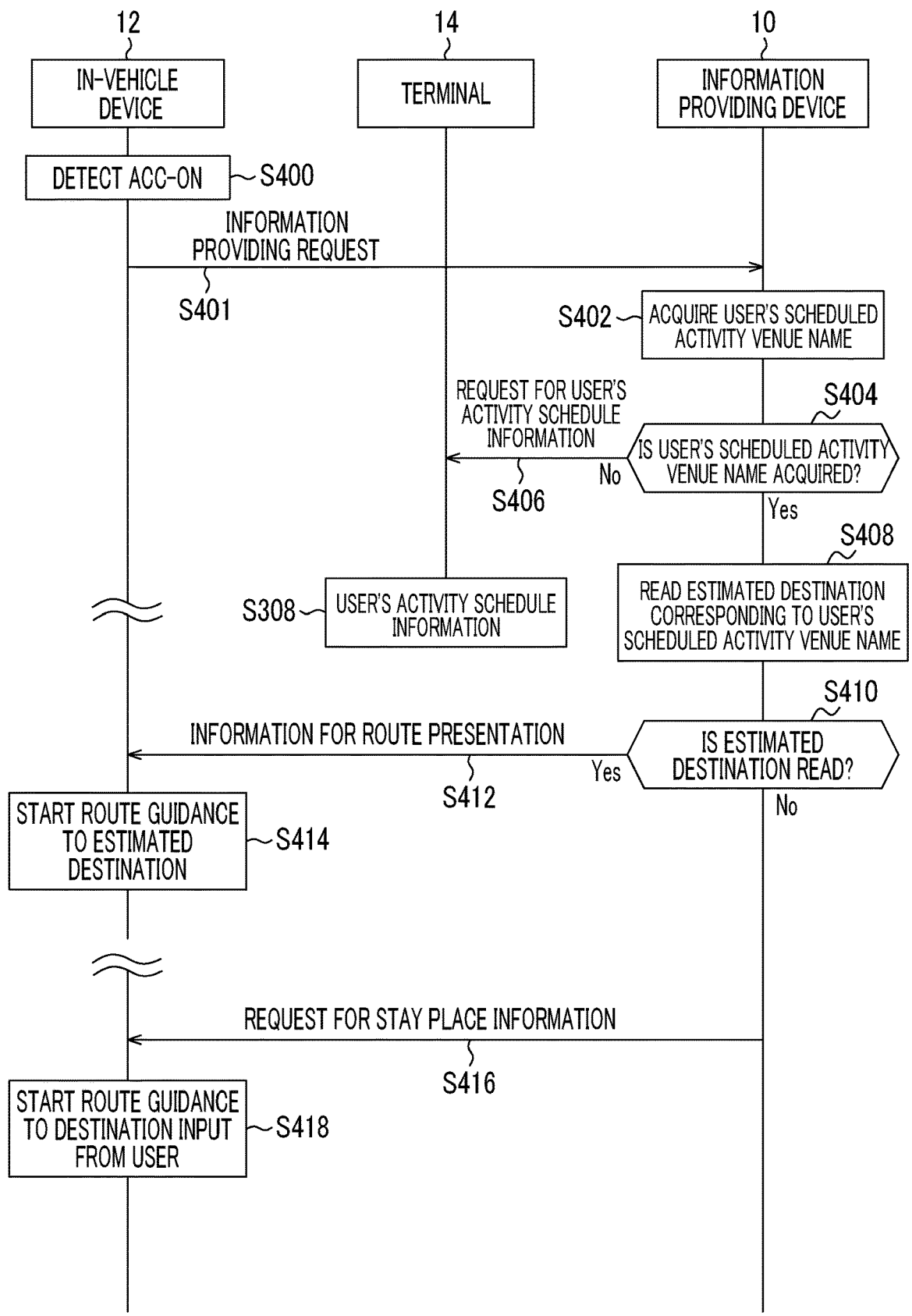
FIG. 4 is a sequence diagram illustrating a procedure by which the information providing device processes the user's activity schedule information.

FIG. 4 illustrates a procedure by which the information providing device 10 processes the user's activity schedule information 111. The procedure illustrated in FIG. 4 is executed, for example, in response to activation of the in-vehicle device 12 (ACC-ON) caused when the user starts driving.

When the in-vehicle device 12 detects ACC-ON (Step S400), the in-vehicle device 12 transmits an information provision request to the information providing device 10 (Step S401).

The information providing device 10 acquires a user's scheduled activity venue name from the user's activity schedule information 111 (Step S402). When the information providing device 10 executes such an operation, the scheduled activity venue name acquisition unit 114 is implemented. When a user's scheduled activity venue name cannot be acquired (No in Step S404), for example, when a user's scheduled activity venue name has not been input in the activity schedule, the information providing device 10 requests the terminal 14 to transmit the user's activity schedule information 111. Then, Step S308 the following steps in FIG. 3 are executed again.

When the user's scheduled activity venue name can be acquired in Step S402 (Yes in Step S404), the information providing device 10 reads an estimated destination on a map, which corresponds to the user's scheduled activity venue name, from the vocabulary database 112 of the storage unit 102 (Step S408). When the estimated destination corresponding to the user's scheduled activity venue name can be read (Yes in Step S410), the information providing device 10 transmits, to the in-vehicle device 12, information for presenting a route to the estimated destination to the user (Step S412). When the information providing device 10 executes such an operation in Step S412, the providing unit 116 is implemented. Then, the in-vehicle device 12 starts route guidance to the estimated destination based on the information provided from the information providing device 10 (Step S414).

On the other hand, when the estimated destination corresponding to the user's scheduled activity venue name cannot be not read in Step S410 (No in Step S410), for example, when the estimated destination that may correspond to the user's scheduled activity venue name is not stored in the vocabulary database 112, the information providing device 10 requests the in-vehicle device 12 to transmit information indicating a stay place (Step S416). Such an operation in Step S416 may be a part of the operation of the stay place acquisition unit 117. In this case, the in-vehicle device 12 searches for a route to a destination that the user directly inputs into the in-vehicle device 12 and starts route guidance (Step S418).

Figure 5:
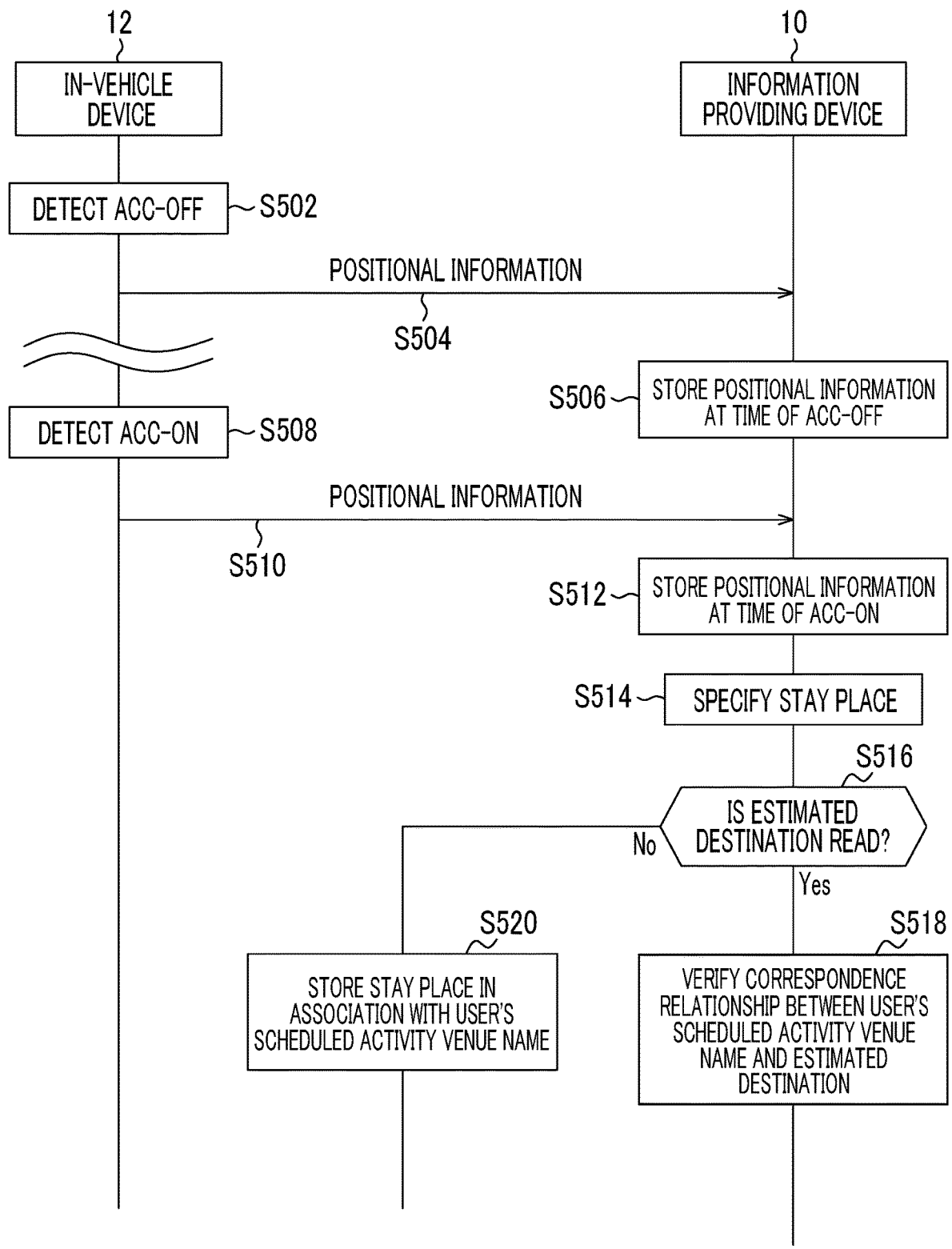
FIG. 5 is a sequence diagram illustrating a procedure by which the information providing device changes an estimated destination to be associated with a scheduled activity venue name.

FIG. 5 is a sequence diagram illustrating a procedure by which the information providing device 10 changes an estimated destination to be associated with a scheduled activity venue name. The procedure indicated in FIG. 5 is executed when the in-vehicle device 12 starts route guidance (Step S414) based on the information provided from the information providing device 10 (Step S412) or when the in-vehicle device 12 starts route guidance based on a user input (Step S418) after the in-vehicle device 12 receives a request for the information indicating the stay place (Step S416) without being provided with information from the information providing device 10.

When the vehicle driven by the user arrives at the estimated destination or the input destination and the in-vehicle device 12 detects ACC-OFF (Step S502), the in-vehicle device 12 transmits positional information at this time to the information providing device 10 (Step S504). Then, the information providing device 10 stores the positional information at the time of ACC-OFF in the storage unit 102 (Step S506). Next, when the in-vehicle device 12 detects ACC-ON (Step S508), the in-vehicle device 12 transmits positional information at this time to the information providing device 10 (Step S510). Then, the information providing device 10 stores the positional information at the time of ACC-ON in the storage unit 102 (Step S512). When the position of the vehicle (i.e., the position of the in-vehicle device 12) at the time of ACC-OFF coincides with the position of the vehicle (i.e., the position of the in-vehicle device 12) at the time of ACC-ON, the information providing device 10 specifies the position as a location where the user stays to carry out a scheduled activity, that is, as a stay place. The stay place may include, in addition to the position, a facility name or a place name on a map, which corresponds to the position. A condition for specifying a stay place may be a condition that an elapsed time from ACC-OFF to ACC-ON is equal to or longer than a predetermined time (e.g., a time equal to or longer than 15 minutes, which is set as appropriate). In this way, it is possible to avoid an erroneous determination that would otherwise be made when the user stops by somewhere on the route. Operations in Step S416 in FIG. 4 and Steps S506 and S512 to S514 in FIG. 5 may be operations of the stay place acquisition unit 117.

Next, when the estimated destination corresponding to the user's scheduled activity venue name is stored in the vocabulary database 112 and the estimated destination is read (Yes in Step S516), that is, when an affirmative determination is made in Step S410 in FIG. 4, the information providing device 10 verifies the correspondence relationship between the user's scheduled activity venue name and the estimated destination by making comparison between the estimated destination and the stay place (Step S518).

On the other hand, when the estimated destination corresponding to the user's scheduled activity venue name is not read (No in Step S516), that is, when a negative determination is made in Step S410 in FIG. 4, the information providing device 10 stores the stay place in association with the user's scheduled activity venue name (Step S520). That is, the information providing device 10 associate the user's scheduled activity venue name and the stay place with each other and store them in the vocabulary database 112.

Operations in Steps S518 and S520 may be operations of the management unit 115.

Figure 6:
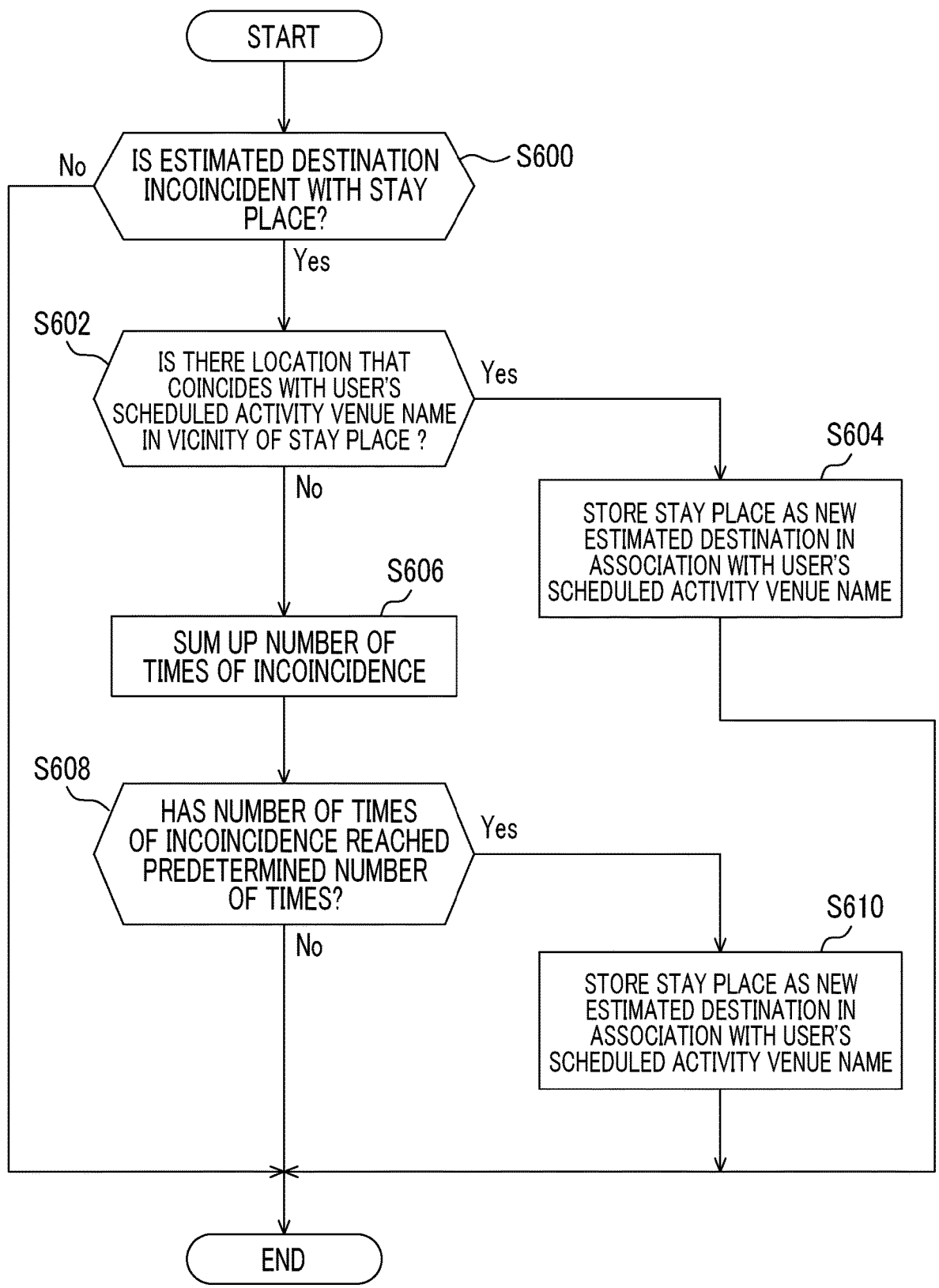
FIG. 6 is a flowchart illustrating a procedure by which the information providing device changes the estimated destination to be associated with the scheduled activity venue name.

FIG. 6 is a flowchart illustrating a detailed procedure in Step S518 in FIG. 5.

The information providing device 10 compares the estimated destination and the stay place with each other. When the estimated destination and the stay place coincide with each other (No in Step S600), the information providing device 10 ends the processing. In this case, because the vehicle arrives and stays at the estimated destination associated with the user's scheduled activity venue name, it is confirmed that the estimated destination conforms to the user's intention.

On the other hand, when the estimated destination and the stay place are incoincident with each other (i.e., when the estimated destination and the stay place differ from each other) (Yes in Step S600), the information providing device 10 searches for a location on the map, which coincides with the user's scheduled activity venue name, more specifically, a location on the map, which has a facility name or a place name that at least partially coincides with the user's scheduled activity venue name, in the vicinity of the stay place (within a distance range set as appropriate, for example, within a radius of 1 km). When such a location is found (Yes in Step S602), the stay place is stored as a new estimated destination in association with the user's scheduled activity venue name (Step S604). That is, the estimated destination associated with the user's scheduled activity venue name is overwritten with the stay place, in the vocabulary database 112. Then, the information providing device 10 ends the processing. For example, when a scheduled activity venue is a part of a facility having a large site and the scheduled activity venue is distant from a location in the site, where the vehicle is parked, or when a scheduled activity venue is within an urban area and the scheduled activity venue is distant from a parking facility in the urban area, where the vehicle is parked, the user's scheduled activity venue name is incoincident with the parking location, that is, the stay place. In such a case, the stay place is stored as a new estimated destination in association with the user's scheduled activity venue name. Thus, when the user visits the scheduled activity venue again, it is possible to guide the user to a highly-convenient location.

When a location which coincides with the user's scheduled activity venue name is not found in the vicinity of the stay place in Step S602 (No in Step S602), the information providing device 10 sums up the number of times that the estimated destination associated with the user's scheduled activity venue name and the stay place are incoincident with each other (Step S606). When the number of times of incoincidence is less than a predetermined number of times (No in Step S608), incoincidence between the estimated destination associated with the user's scheduled activity venue name and the stay place is regarded as an incidental event. Thus, the information providing device 10 ends the processing. On the other hand, when the number of times of incoincidence reaches the predetermined number of times (Yes in Step S608), the information providing device 10 stores the stay place, as a new estimated destination, in association with the user's scheduled activity venue name (Step S610), that is, the information providing device 10 overwrites the vocabulary database 112 and ends the processing. In this case, even when a location which coincides with the user's scheduled activity venue name is not present in the vicinity of the stay place, the stay place is stored in association with the user's scheduled activity venue name because the user who intends to visit the user's scheduled activity venue name stays at the stay place very often. Thus, it is possible to guide the user to a location that conforms to the user's intention when the user visits the scheduled activity venue again. The predetermined number of times to be compared with the number of times of incoincidence in step S608 may be set to any number of times (e.g., five times or more) with which it is possible to reliably determine that the stay place conforms to the user's intention.

In the present embodiment, a destination corresponding to a user's scheduled activity venue name may be estimated for each user. For example, the information providing device 10 stores the user's activity schedule information 111 and the vocabulary database 112 for each user along with identification information about the user, and the in-vehicle device 12 stores the identification information of the user. The in-vehicle device 12 sends, to the information providing device 10, the identification information about the user along with an information provision request (Step S401 in FIG. 4) after activation of the in-vehicle device 12, and the information providing device 10 checks the received identification information against the identification information stored in association with the user's activity schedule information 111. Then, when the received identification information matches the identification information stored in association with the user's activity schedule information 111, the information providing device 10 estimates a destination corresponding to the user's scheduled activity venue name in the user's activity schedule. When the estimated destination differs from the stay place, the information providing device 10 updates the summation of the number of times of incoincidence corresponding to the user, and updates the estimated destination corresponding to the user's scheduled activity venue name with the stay place depending on the summation. In this way, even when naming of the scheduled activity venue name varies depending on users, it is possible to estimate a destination so as to offer greater convenience for each user.

As described above, according to the present embodiment, it is possible to appropriately estimate a destination corresponding to a user's scheduled activity venue name and to present the estimated destination to a user. In the in-vehicle device 12, the positional information notification unit 131 derives a current position of the vehicle based on the positioning information and the information regarding a motion state of the vehicle. Thus, it is possible to reduce an error due to, for example, irregular reflection of a positioning signal caused by a building, as compared to a case where a current position is derived only from the positioning information. Thus, it is possible to derive a more accurate current position. The stay place is specified based on such positional information, and the stay place is associated, as a new estimated destination, with the user's scheduled activity venue name. Thus, it is possible to estimate the destination with higher accuracy.

While the example embodiment of the present disclosure has been described with reference to the drawings, a person skilled in the art can easily make various changes and modifications to the foregoing embodiment within the scope of the present disclosure. It should be noted that such changes and modifications are included in the scope of the present disclosure. For example, the functions included in above-described units or above-described steps may be rearranged as long as no logical contradiction arises, and two or more units or two or more steps may be combined into a single unit or step or may be further divided.

For example, in the foregoing embodiment, a part of the configuration and function of the information providing device 10 may be implemented by another device. For example, a part of the configuration and function of the information providing device 10 may be implemented by the in-vehicle device 12.

For example, a general-purpose electronic apparatus, such as a mobile phone, a smartphone, a tablet terminal, or a mobile computer may function as the information providing device 10 according to the foregoing embodiment. Specifically, the information providing device 10 and the terminal 14 according to the foregoing embodiment may be integrated into a single-piece unit. In this case, the information providing device 10 and the in-vehicle device 12 performs data communication, for example, using short-distance communication technology, such as Bluetooth (Registered Trademark).

Examples of the network 18 in the foregoing embodiment include, in addition to the above-described example, an ad hoc network, a local area network (LAN), a metropolitan area network (MAN), a cellular network, a wireless personal area network (WPAN), a public switched telephone network (PSTN), a terrestrial wireless network, an optical network, other networks, and any combination thereof. Constituent elements of the wireless network include, for example, an access point (e.g., a Wi-Fi access point), and a femtocell. In addition, a wireless communication device may be connected to a wireless network using Wi-Fi (Registered Trademark), a cellular communication technology, or other wireless technologies and technical standards, other than Bluetooth.

As described above, various aspects of the present disclosure may be implemented in various embodiments, which are all included in the scope of the present disclosure

What is claimed is:

1. An information providing device comprising:
a memory configured to store estimated destinations on a map in association with respective scheduled activity venue names; and
a processor configured to
acquire a user's scheduled activity venue name from user's activity schedule information,
read a user's estimated destination corresponding to the user's scheduled activity venue name from the memory,
provide an in-vehicle device with information for presenting a route to the user's estimated destination,
acquire information regarding a stay place from the in-vehicle device, and
store the stay place, in the memory, as a new estimated destination in association with the user's scheduled activity venue name, when the user's estimated destination differs from the stay place.

2. The information providing device according to claim 1, wherein the processor is configured to store the stay place, in the memory, as the new estimated destination in association with the user's scheduled activity venue name, when the user's estimated destination differs from the stay place and a location corresponding to the user's scheduled activity venue name is present in a vicinity of the stay place.

3. The information providing device according to claim 1, wherein the processor is configured to store the stay place, in the memory, as the new estimated destination in association with the user's scheduled activity venue name, when the number of times that the user's estimated destination differs from the stay place reaches a predetermined number of times.

4. The information providing device according to claim 1, wherein the processor is configured to derive the stay place from information regarding a position where the in-vehicle device is present when the in-vehicle device is deactivated and information regarding a position where the in-vehicle device is present when the in-vehicle device is activated.

5. The information providing device according to claim 4, wherein the processor is configured to derive the stay place, when an elapsed time from deactivation of the in-vehicle device to activation of the in-vehicle device is equal to or longer than a predetermined time.

6. The information providing device according to claim 1, wherein the information regarding the stay place includes a position of a vehicle in which the in-vehicle device is mounted, the position of the vehicle being derived based on a motion state of the vehicle.

7. A non-transitory computer-readable medium storing a program configured to enable a processor to execute an information providing method using an information providing device including the processor and a memory, the memory being configured to store estimated destinations on a map in association with respective scheduled activity venue names, and the program being configured to enable the processor to execute a control process, the control process comprising:
acquiring a user's scheduled activity venue name from user's activity schedule information;
reading a user's estimated destination corresponding to the user's scheduled activity venue name from the memory;
providing an in-vehicle device with information for presenting a route to the user's estimated destination;
acquiring information regarding a stay place from the in-vehicle device; and
storing the stay place, in the memory, as a new estimated destination in association with the user's scheduled activity venue name, when the user's estimated destination differs from the stay place.

8. An information providing system comprising:
an in-vehicle device; and
an information providing device, wherein
the in-vehicle device includes
an output device configured to output a route to a destination, and
a transmitter configured to transmit information regarding a stay place to the information providing device,
the information providing device includes a memory and a processor,
the memory is configured to store estimated destinations on a map in association with respective scheduled activity venue names, and
the processor is configured to
acquire a user's scheduled activity venue name from user's activity schedule information,
read a user's estimated destination corresponding to the user's scheduled activity venue name from the memory,
provide the in-vehicle device with information for presenting a route to the user's estimated destination, and
store the stay place acquired from the in-vehicle device, in the memory, as a new estimated destination in association with the user's scheduled activity venue name, when the user's estimated destination differs from the stay place acquired from the in-vehicle device.

9. An information providing method using an information providing device and an in-vehicle device, the information providing device including a processor and a memory, and the memory being configured to store estimated destinations on a map in association with respective scheduled activity venue names, the information providing method comprising:
acquiring, by the processor, a user's scheduled activity venue name from user's activity schedule information;
reading, by the processor, a user's estimated destination corresponding to the user's scheduled activity venue name from the memory;

providing, by the processor, the in-vehicle device with information for presenting a route to the user's estimated destination;

outputting, by the in-vehicle device, a route to the user's estimated destination;

transmitting, by the in-vehicle device, information regarding a stay place to the information providing device; and storing, by the processor, the stay place acquired from the in-vehicle device, in the memory, as a new estimated destination in association with the user's scheduled activity venue name, when the user's estimated destination differs from the stay place acquired from the in-vehicle device.

* * * * *